E. BOUSCAY, Jr.
Sewing-Machine.
No. 7684 Reissued May 15, 1877
Fig. 1.
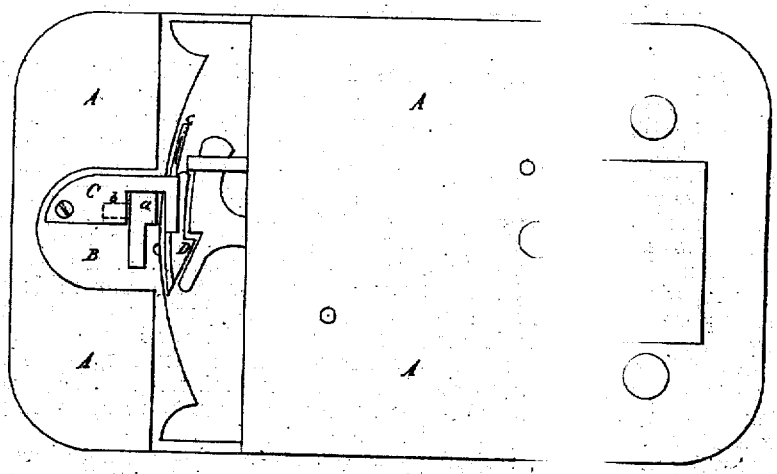
Fig. 5.
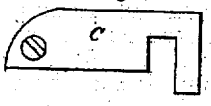
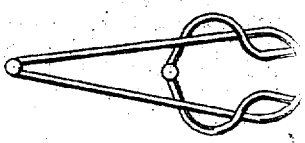
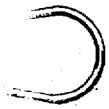
Fig. 2.
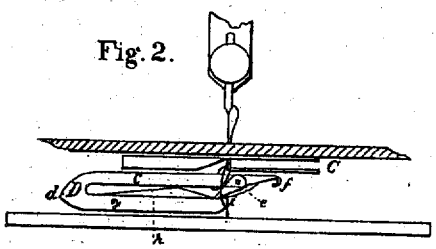
Fig. 3.
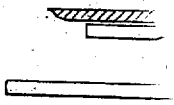
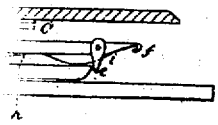
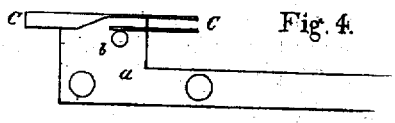
Fig. 4.
WITNESSES:
Frank Baker
Peter Gray
Bouscay Jr.
N.Y. PHOTO-LITHOGRAPHIC CO. N.Y. (OSBORNE'S PROCESS)

2 Sheets—Sheet 2.

E. BOUSCAY, Jr.

SEWING-MACHINE.

No. 7,684. Reissued May 15, 1877.

Eloi Bouscay Jr.
INVENTOR

Attest
H. L. Benning
A. W. Bright.

By Leggett and Leggett.
ATTORNEY

N. PETERS, PHOTO-LITHOGRAPHER, WASHINGTON, D. C.

UNITED STATES PATENT OFFICE.

ELOI BOUSCAY, JR., OF NORWALK, OHIO.

IMPROVEMENT IN SEWING-MACHINES.

Specification forming part of Letters Patent No. 127,145, dated May 28, 1872; reissue No. 7,684, dated May 15, 1877; application filed December 29, 1876.

*To all whom it may concern:*

Be it known that I, ELOI BOUSCAY, Jr., of Norwalk, in the county of Huron, in the State of Ohio, have invented a new and useful Improvement in Sewing-Machines; and declare the following to be such a full, clear, and exact description thereof as will enable others skilled in the art to which it relates to make and use it, reference being had to the accompanying drawing, which forms a part of this specification.

My invention relates to that class of sewing-machines which use only one thread, and make a stitch called "single-thread lock-stitch," and the object of my invention is to simplify and make more certain the operation of the stitch-making device; and my invention consists, first, in uniting the two heretofore separate parts known, respectively, as "looper" and "looper-driver," and making them substantially one and the same piece; second, in securing the latch in an open position, when required, by means of a depression, either stationary or movable, acting on the upper portion of the latch projecting by the looper for that purpose.

My invention further consists in the take-up mechanism, as follows in description and claims.

Figure 7:
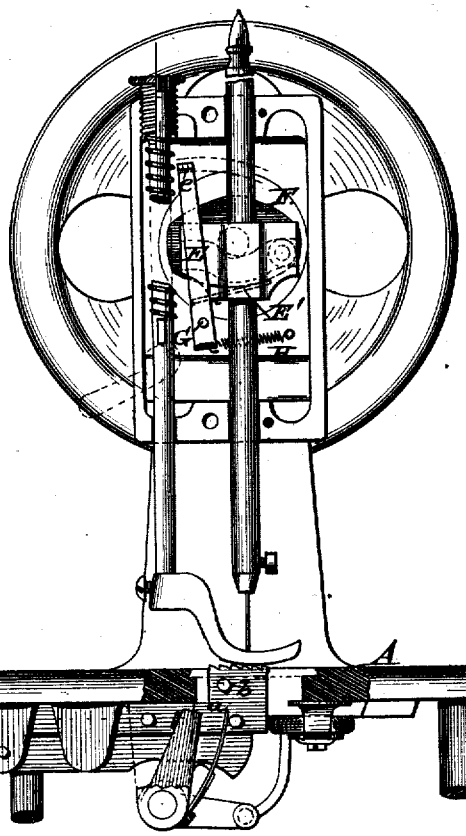
Figure 8:
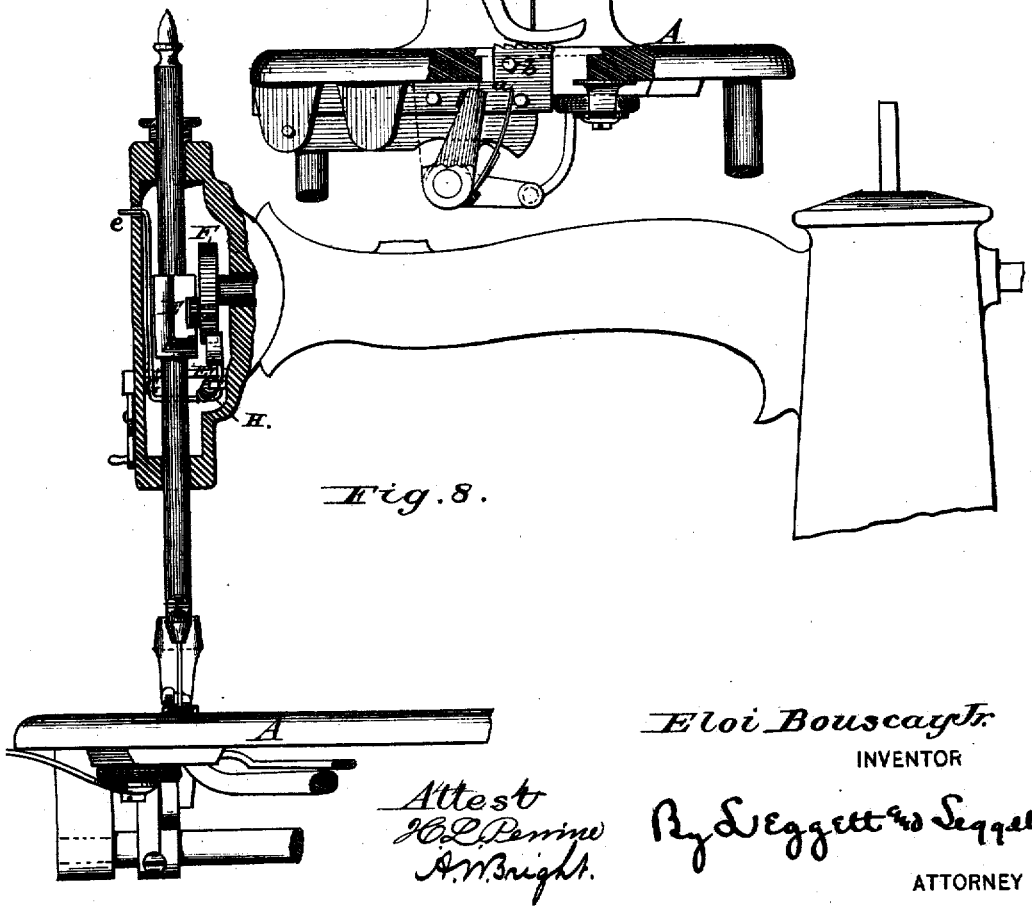

Figure 1 is a plan view of a sewing-machine base embodying my improvements, with needle and cloth plates removed. Fig. 2 is a detailed side view of a sewing-machine shuttle-race, containing my looper in its forward portion and in the act of forming a stitch. Fig. 3 is a similar view with the looper in a position to take a loop from the needle. Fig. 4 is a detailed side view of a feeding-bar, showing the pin which raises the latch-opener when required. Fig. 5 is a plan view of my latch-opener as at present used. Fig. 6 is a diagram illustrating the single-thread, woven, or lock stitch as made by my improved looper. Fig. 7 is an end view of the machine with the face-plate removed, exposing the take-up mechanism. Fig. 8 is a side view, in section, showing the same mechanism.

A is a sewing-machine base; B, the recess for needle-plate; C, the latch-opener. *a* is the feed-bar. *b*, in dotted lines, is a pin projecting out of the side of the feed-bar and under the latch-opener, by means of which the feed in its upward movement, preparatory to feeding the fabric along, raises the latch opener out of contact with the looper when moving backward, and while the first loop slides on the bar *c* toward the point of the looper D and over the latch *e*, and allows the thread to draw the latch open without any obstruction, as in Fig. 3, in which C is the latch-opener raised, and D the looper about to take a loop from the needle. When the looper enters the loop of needle-thread the feed-bar drops, and with it the latch-opener C, which is, in itself, a spring, fastened to the base A at the bottom of the needle-plate recess B, on a plane level with the top of the looper, and the opener comes in contact with the upper portion of the latch *e*, projecting above the looper D, opens the former, and holds it in that position until the loop is drawn past it toward the back end of the looper and into the hook *f*, while, at the same time, the loop, then sliding on the bar *c* toward the hook *f*, strikes the latch *e*, closes it, passes over the hook and around the loop held by this hook, and these movements are repeated for each stitch.

The stitch-forming device, which I call a "looper," and lettered D, is fully illustrated in Figs. 2 and 3. It is composed of a bar, *c*, and base 2, united at the left, and forming a point, *d*, similar to a common shuttle-point. The bar *c* is provided with a hook, *f*, and latch *e*, which is closed over the hook by the loops passing off from the bar *c*.

The end of said latch *e* opposite that which comes in contact with the hook *f* is made in the shape of a cam projecting sufficiently through the bar *c* of looper D to come in contact with the latch-opener C as the former passes by the latter. This causes the latch *e* to open and remain so until the loop has been drawn up back of the looper into the hook *f*, as heretofore described. The spring *h*, between the bar *c* and base 2, has for its object to prevent accidental long loops passing off from the bar from missing the latch, and the guard *i* at the rear of the base 2 is to prevent the thread from drawing up suddenly against the bar *c* and opening latch *e*, and holding the latch in such a manner as to break the thread.

The latch-opener may be either movable or stationary, as I have used a stationary projection with entire success. Neither do I confine myself to the particular shape of the latch, nor the direction in which it opens, as it can open at the side of the bar *c* and embody the same principle.

E is the take-up, and is constructed and operated substantially as follows: The arm E extends down below the bottom of the cam-eccentric F, is pivoted at G, and has an arm, E′, projecting up and impinging against the face of the cam F, and a spring, H, causes the arm E′ to always keep in contact with the said cam. The cam F is of such a shape that in revolving in contact with the arm E, as the latter is constantly pressed against the cam by the spiral spring H, the take-up E will be given the proper motion at the proper time to properly take up and let off the thread.

I find that the device shown in the drawing is a very simple and effective one, being simply a piece of metal bent with the protruding end *e*, the arm E, the curved bottom, and the arm E′, all in a single piece.

This device cannot get out of order, and is very simple and cheap of construction. The particular form of the take-up may be varied somewhat from the U form here shown without departing from my invention, which contemplates making it with the arm E *e* and an arm, E′, the whole pivoted with a pivot, G, and in connection therewith a spring, H, operating to force the arm E′ constantly against the cam-eccentric.

It will be observed that the take-up mechanism, as shown in the drawings, is protected in front by the face-plate, which, when in position with its engaging parts, incloses the said mechanism. A laterally-curved slot is formed in the upper cross portion of the face-plate, through which the eye projection *e* extends right-angularly forward, and thereby affords means for connecting the thread with the same.

It will be seen that by the construction of the take-up mechanism shown and described the spring H acts as a counterpoise to any strain that may be put upon the thread engaging with the eye of the lever-arm E, and that, in instance of the thread becoming entangled or caught during the operation of the machine, the take-up will be fulcrumed on its pivot G, between the two forces exerted upon the respective arms E and E′ by the thread on the one hand, and the spring H on the other hand.

By the yielding of the spring as it gives way to the superior strength of the thread, the short lower arm E′ is drawn away from the cam-eccentric F, and the latter keeps on revolving without adding any strain to the thread. By this means the thread is prevented from being broken by the actuating-cam as the machine continues in operation after the thread is caught or otherwise entangled.

Having thus described my invention, I do not claim, broadly, mechanism to produce the peculiar stitch herein mentioned; but

I claim as my invention—

1. A looper, D, composed of two rigidly-connected parts, C and D, the former being provided with a hook, and constructed and operating substantially as described.

2. The combination of the latch *e*, with its heel projecting through the bar *c* of the looper, with a projection operating to open such latch, as described.

3. The movable latch-opener, combined with the looper, and operated by the feeding device, as and for the purpose set forth.

4. In a machine wherein the rotary driving-shaft extends forward to the head of the machine, the combination, with a cam secured to the forward portion of said rotary driving-shaft, of a take-up mechanism held in direct contact with said cam by a spring, the cam operating to let off the thread, while the take-up is effected by the spring, substantially as set forth.

5. The combination, with a cam attached to the rotary driving-shaft and needle-bar, actuated by a pin or roller secured to the face of the cam, of a take-up mechanism held in direct contact with the periphery of the cam by a spring, the cam operating to let off the thread, while the take-up is effected by the spring, substantially as and for the purpose described.

6. The combination, with a cam secured to the rotary driving-shaft, of a take-up mechanism, which latter consists, essentially, in a lever pivoted below the cam, and a spring adapted to hold one end of the lever against the cam, whereby the cam operates to let off the thread, while the take-up is effected by the spring, substantially as and for the purpose described.

7. The combination, with a cam secured to a rotary driving-shaft, of a take-up mechanism held in direct contact with the cam by a spring, the vibrating arm of the take-up having its extreme upper end bent at right angles to its length, to project through the slotted face-plate, substantially as described.

In testimony whereof I have hereunto set my hand and seal this 26th day of April, A. D. 1876.

ELOI BOUSCAY, JR. [L. S.]

Witnesses:
CORYDON KINGSBURY,
A. B. GRIFFIN.